(12) United States Patent
Varda

(10) Patent No.: US 8,826,390 B1
(45) Date of Patent: Sep. 2, 2014

(54) SHARING AND ACCESS CONTROL

(75) Inventor: Kenton Taylor Varda, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/467,947

(22) Filed: May 9, 2012

(51) Int. Cl.
*G06F 7/04* (2006.01)

(52) U.S. Cl.
USPC ............................................................ 726/4

(58) Field of Classification Search
None
See application file for complete search history.

(56) References Cited

U.S. PATENT DOCUMENTS

| | | |
|---|---|---|
| 6,279,111 B1 | 8/2001 | Jensenworth et al. |
| 6,308,274 B1 | 10/2001 | Swift |
| 7,260,543 B1 * | 8/2007 | Saulpaugh et al. ............ 705/307 |
| 7,404,203 B2 | 7/2008 | Ng |
| 2010/0081417 A1 * | 4/2010 | Hickie ........................ 455/414.1 |

* cited by examiner

*Primary Examiner* — Brandon Hoffman
(74) *Attorney, Agent, or Firm* — McDermott Will & Emery LLP

(57) ABSTRACT

A system and machine-implemented method for providing secure access to an object, the method including receiving an indication of a request from a first entity to share access and delegation rights to a second object with a first object, the second object having a corresponding access control list (ACL) including a listing of one or more authorized entities having access to the second object including the first entity, generating a token representing access and delegation rights of the first object with respect to the second object and providing the token to the first object, adding a token identifier (ID) corresponding to the token to the ACL of the second object, such that the first object is added to the authorized entities having access and delegation rights to the second object.

22 Claims, 9 Drawing Sheets

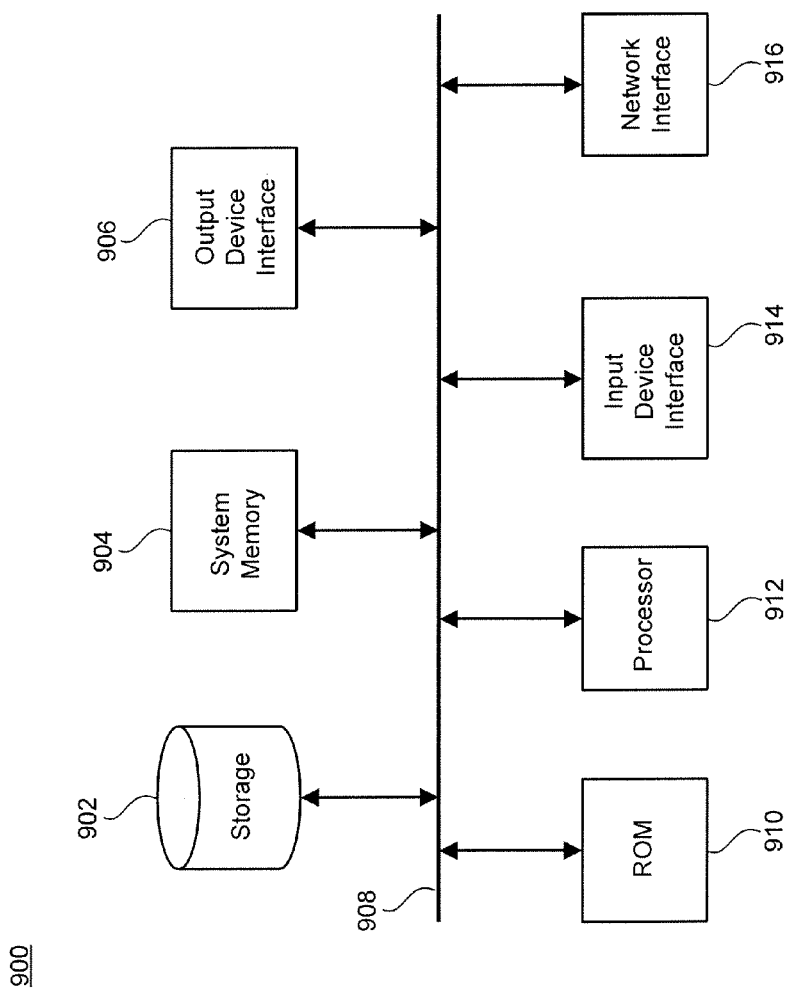

SHARING AND ACCESS CONTROL

BACKGROUND

Private objects shared with a user or group may be associated with an Access Control List (ACL). The ACL includes a list of users and groups granted access to the object. In some cases, an object (e.g., a document, collaboration session, process) may require access to another object (e.g., embedded objects, resources), and/or authorization to share the access to that object with other entities (e.g., other objects, users or groups). Access control based purely on user identity is insufficient for modeling complex graphs of objects with varying owners, where the object needs access to other objects and/or to delegate such access rights to other entities (e.g., objects, users, groups).

Capability-based security provides a good solution to these problems. In capability-based security the authority to access an object is itself represented as a piece of data (e.g., a capability token) that may be passed around. However, traditional capability-based security is extremely different from an ACL-based infrastructure, making it hard to transition existing applications from one model to the other. Furthermore, delegation under the capability-based security model involves wrapping the object in layers of proxy objects (each layer representing a level of hierarchy). The proliferation of the proxy objects may add significant latency when making access granting decisions. Additionally, due to the lack of the notion of user identities, search engines that search private data would need to infer ACLs for each object through analysis of the object graph, leading to high chances of costly errors.

Thus it may be desirable to provide a security model that facilitates granting controlled access to objects and facilitating delegation of such access rights while providing for efficient access control.

SUMMARY

The disclosed subject matter relates to a method, executed by one or more computing devices, for providing secure access to an object to a participant of a collaboration session, the method comprising receiving, using the one or more computing devices, an indication of a request from a first entity to share access and delegation rights to a second object with a first object, the second object having a corresponding access control list (ACL) including a listing of one or more authorized entities having access to the second object including the first entity. The method further comprising generating, using the one or more computing devices, a token representing access and delegation rights of the first object with respect to the second object and providing the token to the first object. The method further comprising adding, using the one or more computing devices, a token identifier (ID) corresponding to the token to the ACL of the second object, using the one or more computing devices, such that the first object is added to the authorized entities having access and delegation rights to the second object and receiving, using the one or more computing devices, a request, from the first object, to share access to the second object with one or more entities associated with the first object.

The disclosed subject matter also relates to a system for providing secure access to an object to a participant of a collaboration session, the system comprising one or more processors; and a machine-readable medium comprising instructions stored therein, which when executed by the processors, cause the processors to perform operations comprising receiving an indication of a request from a first entity to share access and delegation rights to a second object with a first object, the second object having a corresponding access control list (ACL) including a listing of one or more authorized entities having access to the second object including the first entity, wherein each of the one or more authorized entities is associated with a level of access representing the rights of the respective authorized entity with regard to the second object and wherein the level of access of the first entity includes delegation rights providing the first entity with authorization to share access to the second object with the first object. The operations further comprising generating a token representing access and delegation rights of the first object with respect to the second object and providing the token to the first object. The operations further comprising adding a token ID corresponding to the token to the ACL of the second object, using the one or more computing devices, such that the first object is added to the authorized entities having access and delegation rights to the second object.

The disclosed subject matter also relates to a machine-readable medium comprising instructions stored therein, which when executed by a machine, cause the machine to perform operations comprising receiving a request, from the first object, to share access to the second object with one or more entities associated with the first object, the request including a token having a token ID and being associated with the first object, the second object having a corresponding access control list (ACL) including a listing of one or more authorized entities having access to the second object including the first entity wherein each of the one or more authorized entities is associated with a level of access representing the rights of the respective authorized entity with regard to the second object. The operations further comprising determining the level of access of the first object, the determining including looking up the token ID within the ACL, wherein the token ID is listed as one of the one or more authorized entities and determining the access right level associated with the token ID. The operations further comprising generating a nested access control list including the one or more entities in response to determining that the access right level associated with the first object includes delegation rights providing the first object with authorization to share access to the second object with other entities and adding the nested ACL within the ACL and associating the nested ACL with the token ID within the ACL, such that the one or more entities are granted access to the second object.

The disclosed subject matter further relates to a method, executed on one or more computing devices, for providing one or more participants of a collaboration session with access to an object, the method comprising receiving, at the one or more computing devices, a request from a user to share an object within a collaboration session, the object having a corresponding access control list (ACL) including one or more authorized entities having access to the object including the user, wherein the user is authorized to share the object with other entities. The method further comprising providing the collaboration session with access to the object by generating a token representing access and delegation rights of the collaboration session over the object, using the one or more computing devices, and adding the token to the ACL of the object, wherein the token provides the collaboration session with authorization to share the object with other entities, in response to the request. The method further comprising identifying, using the one or more computing devices, one or more other entities associated with the collaboration session and adding, using the one or more computing devices, the one or more other entities to the ACL of the object using the delegation rights of the token in order to provide the one or more entities with access to the object. The one or more other entities may be associated with the token within the access control list.

The method may further comprise sending a request to update the access control list, wherein the request comprises a request to remove the token from the access control list. Removing the token from the access control list may invalidate the access rights of the one or more other entities added to the ACL in association with the token. The request may be sent in response to receiving indication that the collaboration session is being terminated.

The one or more other entities may comprise participants of the collaboration session. The step of adding the one or more entities may be performed as each of the one or more entities join the collaboration session. The step of adding the one or more entities may be performed for each of the one or more entities, when the entity requests to access the object.

The step of adding the one or more other entities to the ACL of the object may comprise generating a nested access control list (nested ACL) and adding the nested ACL to the ACL in association with the token and adding the one or more entities to the nested ACL.

Each of the entities listed in the ACL may be associated with a role within the ACL, the role defining a level of access representing the rights of the respective entity with regard to the object. Access rights of each of the one or more entities may be at most equal to the level of access of the collaboration session. Modifying the access rights of the collaboration session may cause a modification of the access rights of the one or more entities.

The method may further comprise receiving a request from an entity to access the object, determining if the entity is listed as an authorized entity within the ACL of the second in response to receiving the request, identifying a delegator associated with the entity within the ACL, determining if the identified delegator associated with the entity has appropriate access rights for accessing the object and granting the entity with access to the object if it is determine that the entity is listed as one of the one or more entities and the delegator associated with the entity has appropriate access rights for accessing the object.

The determining if the entity is listed as an authorized entity may comprise identifying one or more nested ACLs within the ACL of the second object, each of the one or more nested ACLs including a listing of one or more entities and determining if the second entity is listed as one of the one or more entities within one of the identified one or more nested ACLs.

The disclosed subject matter also relates to a system for providing one or more participants of a collaboration session with access to an object, the system comprising one or more processors and a machine-readable medium comprising instructions stored therein, which when executed by the processors, cause the processors to perform operations comprising receiving a request from a user participating in a collaboration session to share an object within the collaboration session, the object having a corresponding access control list (ACL) including one or more authorized entities having access to the object including the user, wherein the user is authorized to share the object with other entities. The operations further comprising generating a token representing access and delegation rights of the collaboration session over the object and adding the token to the ACL of the object, wherein the token provides the collaboration session with authorization to share the object with other entities, in response to the request. The operations further comprising identifying a second user joining the collaboration session and using the delegation rights of the token to add the identified second user to the ACL of the object in order to provide the second user with access to the object.

The operations may further comprise determining that the collaboration session is being terminated and sending a request in response to the determination to update the access control list to remove the token from the access control list. Removing the token from the access control list may invalidate the access rights of the one or more other entities including the second user added to the ACL in association with the token.

The disclosed subject matter also relates to a machine-readable medium comprising instructions stored therein, which when executed by a machine, cause the machine to perform operations comprising identifying an object being shared by a first participant of a collaboration session within the collaboration session, the object having a corresponding access control list (ACL) including one or more authorized entities having access to the object including the first participant, wherein the first participant is authorized to share the object with other entities. The operations further comprising generating a token representing access and delegation rights of the collaboration session over the object, in response to the identifying the object. The operations further comprising adding the token to the ACL of the object, wherein the token provides the collaboration session with access rights over the object including authorization to share the object with other entities. The operations further comprising identifying one or more other entities participating in the collaboration session, wherein each of the one or more other entities comprises a user or a group of users and adding the one or more other entities to the ACL of the object using the delegation rights of the token in order to provide the one or more entities with access to the object.

The step of adding the one or more other entities to the ACL of the object may comprise generating a nested access control list (nested ACL) and adding the nested ACL to the ACL in association with the token and adding the one or more entities to the nested ACL. Each of the entities listed in the ACL may be associated with a role within the ACL, the role defining a level of access representing the rights of the respective entity with regard to the object.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 9 conceptually illustrates an electronic system with which some implementations of the subject technology are implemented.

DETAILED DESCRIPTION

Figure 1:
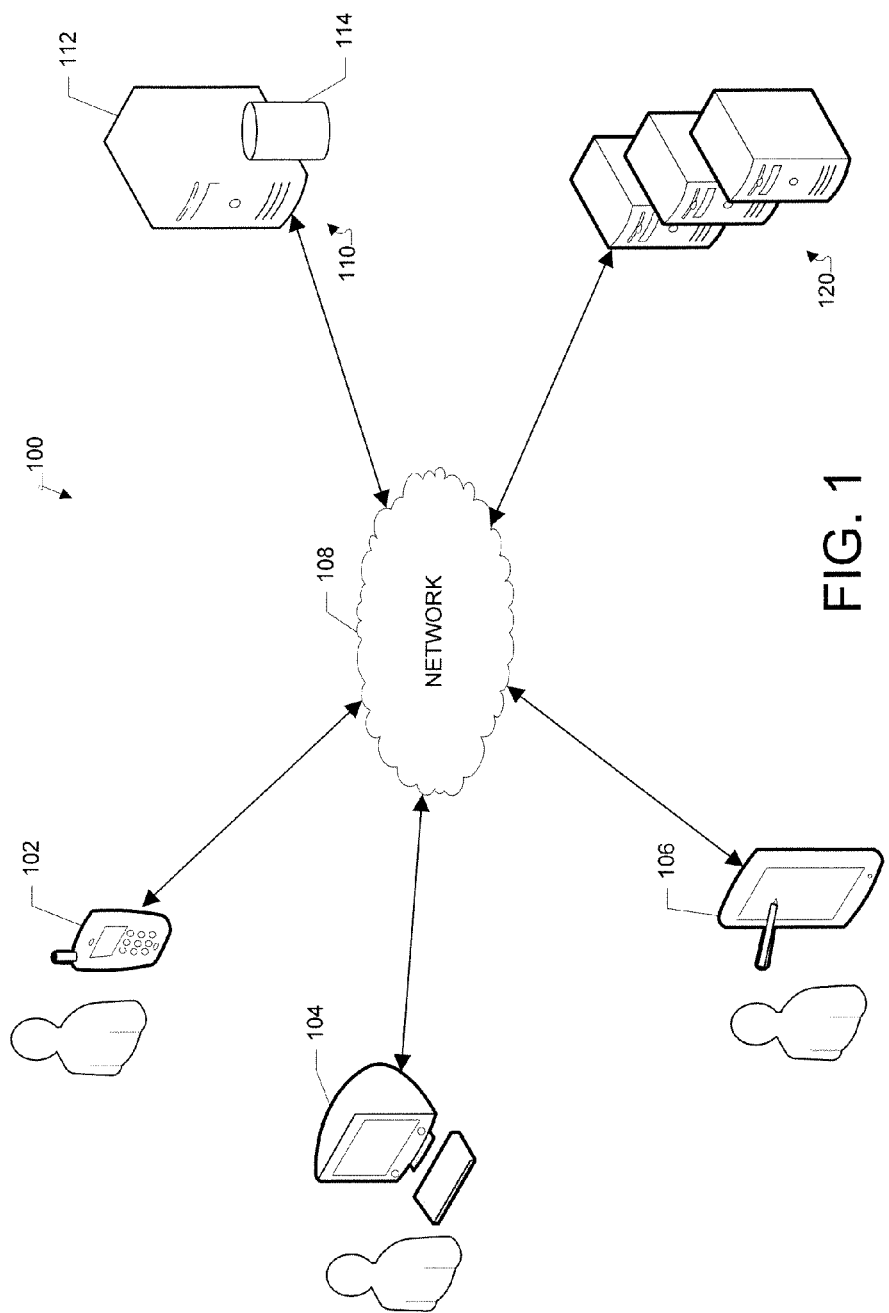
FIG. 1 illustrates an example client-server network environment which provides for object-oriented sharing and access control.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a method for extending the traditional ACL model to provide for granting access to objects in addition to users and/or groups and further providing for efficient delegation and maintenance of such access rights. To provide for granting access to an object, in addition to users/groups, the existing ACL structure is extended to allow an ACL entry to grant access to a "capability token". A capability token (interchangeably referred to herein as a token) is a secret string of bytes which the entity requesting access must present in order to be authorized. Furthermore, to address the need for delegation of the granted access to other objects, the ACL may contain "nested ACLs" to capture delegation. Each nested ACL has a delegator, which is either a user identity (e.g., a user or group ID) or a capability (e.g., a token ID associated with an object). The delegator may freely edit the nested ACL as desired. The nested ACL's entries grant access similar to the top-level ACL's entries. However, the access granted by the nested ACL is limited to the access rights of the delegator, such that the access rights of the entities within the nested ACL are at most equal to the access rights of the delegator.

The process of providing for access and delegation of access is performed using these additional tools. A first object can gain access to a second object by obtaining a capability token for that object. For example, a user having delegation rights (e.g., write access including rights to modify to the ACL of the second object) to the second object (e.g., the owner of the second object or an editor) may share access with a first object. In addition to granting access rights to the first object, the first object is further provided with delegation rights with respect to the second object. In response to the request, the system generates a token and provides the token to the first object. A token identifier (ID) (e.g., hash of the token) is then added as an entry within the ACL of the second object. The first object can then access the second object directly via the token, or can exercise the token in order to delegate its access to other objects or users. The first object may use its capability as a delegator to grant access to other objects by creating a nested ACL (a first ACL within the ACL of the second object).

For example, the second object may comprise a video embedded in the first object (e.g., a document), where the video and the document have different ACLs. It may be desirable that anyone who can access the document should be able to view the video. To accomplish this, the document would first obtain a capability to access the video (e.g., the user having delegation rights in the video would request a token and provide the token to the document). The token is given capabilities as a delegator. Using the token, with its capability as the delegator, the document may request to add a nested ACL within the video's ACL which mirrors the contents of the document's ACL. In another example, the one or more entities within the ACL of the document may be added within the ACL of the document (e.g., listed within the top-level ACL). The access rights of each entity granted access through the document may be associated with the document.

Meanwhile, when a user (e.g., the user or other users having access rights to the second object) accesses the second object directly, he/she is still authorized by an ACL entry listing their user identity explicitly (e.g., as a user or member of a group), rather than through capabilities. Therefore, usability by an end user is unaffected in the common case, search engines still work correctly through the use of ACLs and nested ACLs, and the structure of existing ACL security based systems does not need to be modified. The proxy objects that are common under pure capability-based security are essentially modeled by the ACL itself, with each nested ACL representing a proxy object, thereby minimizing latency overhead since all nested ACLs are stored together with the top-level ACL (e.g., within a central repository) therefore reducing look up.

The subject disclosure is usable for any instance where one or more objects, corresponding to digital files, applications and other similar entities require access to a private object (i.e., an object with limited controlled access). Example cases may include embedding objects (videos, images, other documents) into documents and sites, allowing a second document (e.g., a chart) to be based on a first document (e.g., the contents of a spreadsheet), where some viewers of the second document may not be allowed to view the first document directly, attaching documents (or other objects) to posts, calendar entries, e-mails, or other communications and attaching documents to video conference meetings, such that all participants in the meeting can access the document for the duration of the meeting.

The term "object" as used herein encompasses its plain and ordinary meaning, including, but not limited to, any collection of data digitally stored and/or accessible on a computing device and/or over the internet and may include files, documents, video, audio, images, tools, posts, websites, applications, emails or other messages, collaboration sessions, and/or other digital data, systems or applications.

Each object may be associated with an Access Control List (ACL). An access control list (ACL), with respect to a computer file system, is a list of permissions attached to an object. An ACL specifies which users (individually or as a member of a group) or objects are granted access to objects, as well as what operations are allowed on given objects. Each entry in a typical ACL may specify a subject and an operation. The ACL may include a listing of authorized entities (e.g., users, groups and/or objects) granted access to the object. In one example, the ACL may further include information regarding the source of access for each authorized entity.

As used herein, "collaboration session" refers to a computer based session including a group of people (participants) involved in a common task to achieve a common objective. During a collaboration session various objects may be shared among the participants for the purpose of collaboration.

II. Example Client-Server Network Environment for Facilitating Sharing and Access Control FIG. 1 illustrates an example client-server network environment which provides for object-oriented sharing and access control. A network environment 100 includes a number of electronic devices 102, 104 and 106 communicably connected to a server 110 and one or more remote servers 120 by a network 108. Server 110 includes a processing device 112 and a data store 114. Processing device 112 executes computer instructions stored in data store 114, for example, to assist in facilitating object-oriented sharing and access control with respect to one or more private objects. Remote servers 120 can be any system or device having a processor, a memory and communications capability for hosting an ACL service (e.g., maintaining an ACL for one or more objects).

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 and/or remote servers 120 can be a single computing device such as a computer server. In other embodiments, server 110 and/or remote servers 120 can represent more than one computing device working together to perform the actions of a server computer (e.g., cloud computing). The server 110 and/or remote servers 120 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user interacting with a client device (e.g., electronic devices 102, 104 or 106) having delegation rights to a second object (e.g., the owner of the second object or an editor with rights to add entries to the ACL of the second object) may request to share his/her access and delegation rights with a first object (e.g., a collaboration session). The user may further indicate access limitations with respect to the access rights of the first object (e.g., the collaboration session) with respect to the second object. In response to the request, the system (e.g., hosted at server 110) generates a token and provides the token to the first object (e.g., the collaboration session). The system further generates a token ID (e.g., hash of the token) and requests to add the token ID (e.g., hash of the token) as an entry within the ACL of the second object. The ACL may be maintained by the server 110 or may be maintained by a remote server 120 communicatively coupled with server 110. For example, a request may be sent to a remote ACL service (e.g., hosted at a remote server 120) to update the ACL of the second object.

The first object can then access the second object directly via the token, or can exercise the token in order to share access with other entities (e.g., objects, users, groups). For example, where the first object is a collaboration session, the collaboration session may exercise the token in order to grant access to all participants of the collaboration session. The first object may use its capability as a delegator to grant access to other objects by creating a nested ACL (an ACL within the ACL of the second object). The first object, may for example request to grant access to one or more users (e.g., user interacting with electronic devices 102, 104 and/or 106), the system receives the request and accesses the ACL of the second object. The first object may further indicate access limitations by indicating a level of access for the one or more users which defines the access rights of the one or more users with respect to the second object. The request by the first object is presented using the token.

The system compares the token with the entries of the ACL and determines that the token appears within the ACL as an authorized entity having delegation rights. In another example, where the ACL is maintained remotely, the system may provide the token ID to the ACL service for comparison and may receive the result of the comparison and determine whether the first object is an authorized entity. The system then adds the listed of one or more users to the ACL (e.g., to the top-level ACL or as a nested ACL) in association with the token. The ACL may further include level of access information for each of the one or more users (e.g., as indicated by the first object and/or not exceeding the level of access of the first object).

When a user or object (e.g., a participant of the collaboration session or an object requiring access to the second object) requests to access the second object, the system looks within the ACL of the object for the identity of the requesting user or object. The ACL lookup may include looking up all authorized entities listed within the nested ACLs within the ACL. Thus, if a user or object has been granted access through the token associated with the first object, the system determines that the user or object has access to the second object and provides the user or object with access to the object. Since the access rights of each of the entities are directly associated with the token associated with the first object, when the access rights of the first object terminate, the token associated with the first object is removed from the ACL. Thus, any access rights associated with the token are no longer valid and will not result in granting access to any entities being added to the ACL through the capabilities of the token.

III. Example Processes for Facilitating Sharing and Access Control

Figure 2:
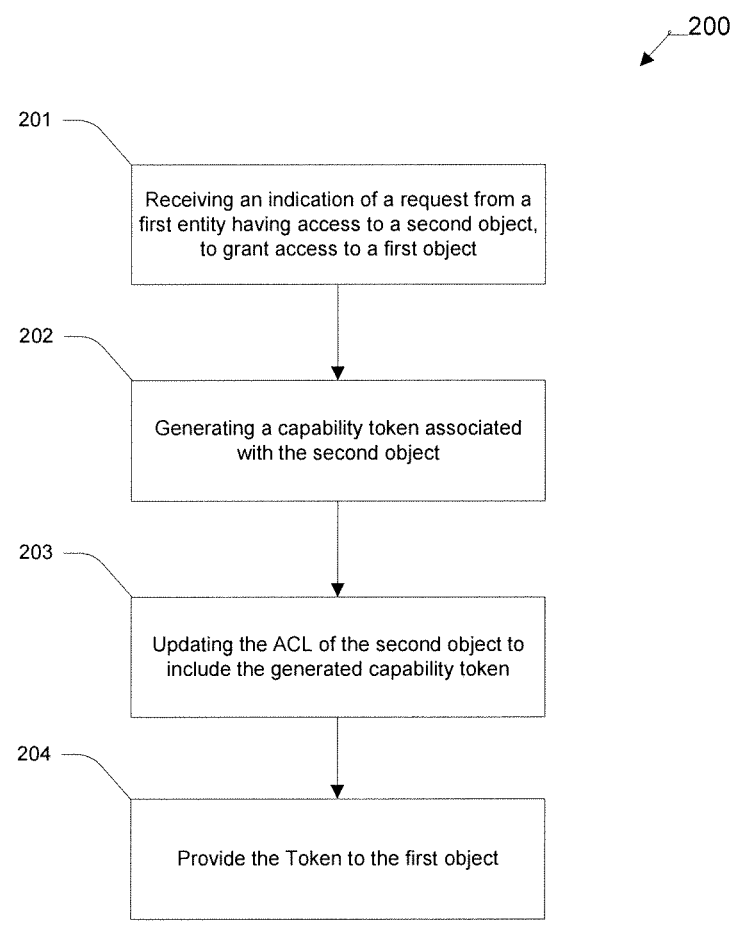
FIG. 2 illustrates a flow diagram of a process for granting a first object access rights to a second object.

FIG. 2 illustrates a flow diagram of a process 200 for granting a first object access rights to a second object. In block 201, the system receives an indication of a request from an entity (e.g., a user individually having access or being a member of a group having access or an object) having access and delegator rights to the second object, to grant the first object access to the second object. In block 202, the system generates a capability token representing access and delegation rights of the first object with respect to the second object. The capability token is a secret string of bytes which an object requesting access must present in order to be authorized. In block 203, the system updates the ACL of the second object to include the generated capability toke associated with the first object. For example, the system generates a token ID (e.g., hash of the token) and request to add the token ID (e.g., hash of the token) as an entry within the ACL of the second object. The ACL may be updated by the system (e.g., where the ACL is maintained locally) or the system may issue a request to a remote server maintaining the ACL, to update the ACL to include the hash of the token. In block 204, the token is provided to the first object. The first object may store the token, and later retrieve the token when requesting access to the second object.

The first object can access the second object directly via the token, or can exercise the token in order to delegate its access to other entities (e.g., objects, groups and/or users). In one example, the access rights granted to the first object are associated with the first entity. For example, the ACL may keep track of the source of access (i.e., the delegator) of the token representing the first object, and the access rights of the first object may only persist while the access rights of the delegator persist, so that the token is only valid where the first entity is still an authorized entity listed within the ACL. Furthermore, access rights granted to the first object are limited by the access rights of the first entity, such that the first entity may not grant more access rights to the first object than those given to the first entity. Thus, if the access rights of the delegator (i.e., the first entity) are later limited, the access rights of the first object may similarly be modified so as to not exceed the access rights of the first entity granting it its rights to the first object.

Using the token, the first object may, where its access rights include delegator rights (e.g., write access), grant access to one or more entities including users, groups and/or other objects. In one example, the first object is associated with its own ACL, and may wish to share its access to one or more objects (e.g., the first object) with entities within its ACL. Such sharing of access rights may be achieved using a nested ACL. An example process 300 for allowing a first object to grant one or more associated entities access to a second object through a nested ACL is described in further detail below with respect to FIG. 3.

Figure 3:
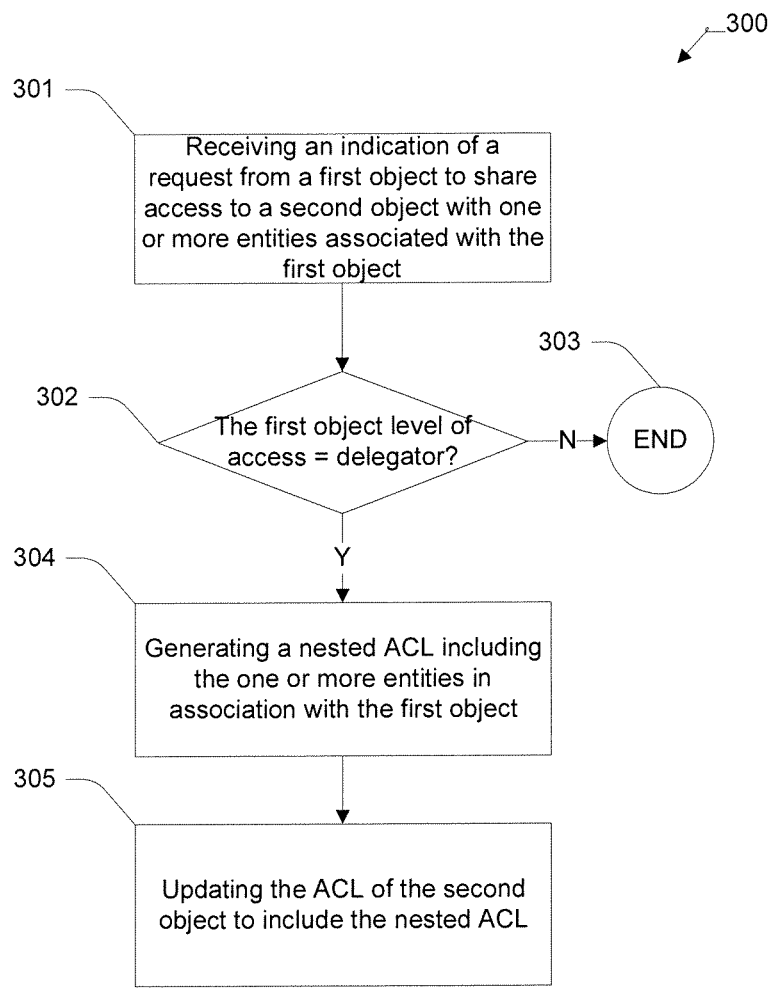
FIG. 3 illustrates a flow diagram of an example process for granting one or more entities associated with a first object with access rights to a second object using a nested ACL.

FIG. 3 illustrates an example process 300 for granting one or more entities associated with a first object with access rights to a second object using a nested ACL. In block 301, the system receives an indication of a request from the first object to grant access to one or more entities associated with the first object (e.g., one or more users, groups and/or other objects listed within the ACL of the first object). In block 302, the system determines if the first object has delegator rights with respect to the second object. For example, the first object may provide its token when requesting to grant access to one or more associated entities. Then system compares the token to the entries within the ACL of the second object or may send the token (or an identifier of the token) to a remote ACL service for comparison, and determines if the first object has access rights to the second object, including delegator rights. For example, the token is determined to correspond to a token ID (e.g., hash of the token) stored within the ACL of the first object.

The ACL may maintain information regarding the level of access defining the access rights for each authorized entity listed within the ACL and the system may determine the access rights of the first object according to the information maintained by the ACL. Furthermore, as described above, the access rights of the first object may be dependent upon the access rights of the entity associated with token as the source of access of the token. The system may thus additionally determine if the delegator associated with the token is valid, and whether the delegator associated with the first object has delegator rights to the second object. If it is determined that the first object does not have delegator rights with respect to the second object, then the process terminates in block 303.

Otherwise, in block 304, the system generates a nested ACL including the one or more entities associated with the first object. The nested ACL may mirror the contents of the first object's ACL or may vary in the number of authorized entities or types of rights granted to each of the one or more entities. The nested ACL's entries grant access similar to the top-level ACL's entries. However, the access granted by the nested ACL is limited to the access rights of the delegator (i.e., the access source of the nested ACL). In step 305, the ACL of the second object is updated to include the nested ACL generated in step 304.

While process 300 is described with respect to an object as the delegator, other entities (e.g., a user) may similarly grant access to one or more other entities according to process 300. In such instances, the nested ACL is associated with the entity (e.g., the user) as the delegator and the access rights of the entities within the nested ACL are limited to the rights of the entity.

Figure 4:
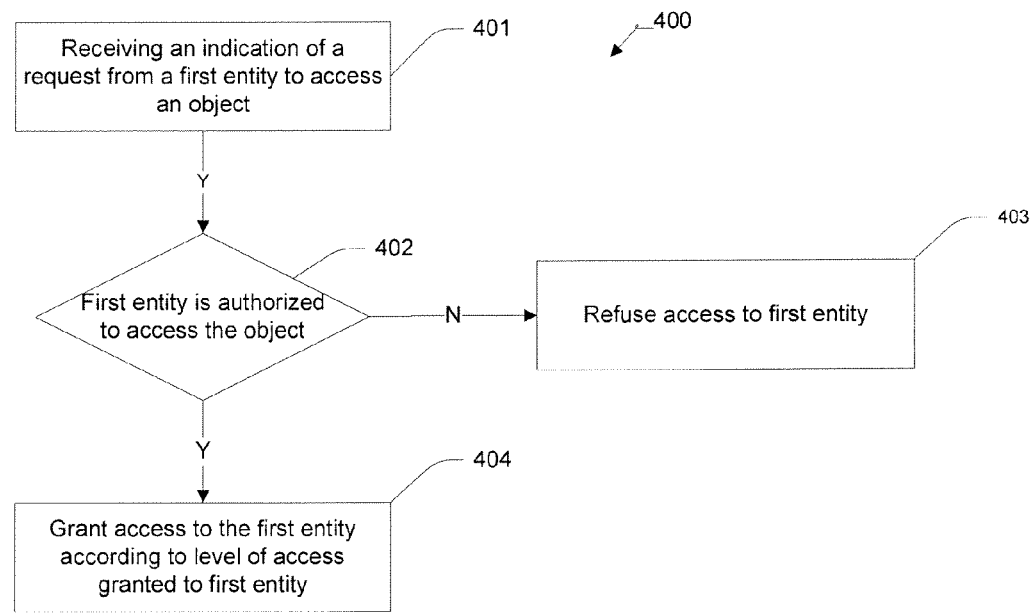
FIG. 4 illustrates a flow diagram of an example process for granting access to an object to a first entity.

FIG. 4 illustrates a flow diagram of a process 400 for granting access to an object to a first entity. In block 401, the system receives an indication of a request from a first entity to access an object. The first entity may be a user or may include an object. Where the first entity is an object, the object may provide a token associated with the object when requesting to access the object. In block 402, the system determines if the first entity requesting access is authorized to access the object. In one example, the system retrieves the ACL and one or more nested ACLs associated with the object and determines if the first entity is listed as an authorized entity within the ACL of the object. In another example, the ACL (including the one or more nested ACLs) may be maintained by a remote ACL service, and the system may provide an identifier of the first entity to the ACL service for determining if the first entity is authorized to access the object (e.g., listed within the top-level ACL or one or more nested ACLs). In one example, the first entity's access rights may be associated with a delegator (e.g., a user sharing access with the first entity). In such instances, the system may determine the delegator associated with the first entity and may only grant the first entity with access if the delegator has valid access to the first object (e.g., where the delegator has been removed from the ACL, then any entities having access through the delegator may no longer have access to the object). Furthermore, the system may limit the access rights of the first entity to those of the delegator (e.g., where the delegator access rights are modified, access rights of the entities associated with the delegator also modified as to not exceed the access rights of the delegator). An example process for determining whether a first entity is authorized to access an object is described in further detail below with respect to FIG. 5.

If in block 402, the system determines that the first entity is authorized to access the object, the process continues to block 404 and grants access to the first entity according to the access rights of the first entity as indicated by the ACL. In one example, the first entity's access rights may be associated with a delegator (e.g., a user sharing access with the first entity). In such instances, the system may determine the delegator associated with the first entity and may only grant the first entity with access if the delegator has valid access to the first object (e.g., where the delegator has been removed from the ACL, then any entities having access through the delegator may no longer have access to the object). Furthermore, the system may limit the access rights of the first entity to those of the delegator (e.g., where the delegator access rights are modified, access rights of the entities associated with the delegator also modified as to not exceed the access rights of the delegator).

If, on the other hand, the system determines that the first entity is not listed within the ACL, the process continues to block 403 where the system refuses access to the first entity. In one example, the access request from the first entity may be for a specific type of access (e.g., request to delegate access, edit the object and/or to view the object). In such instances, in addition to determining whether the first entity is an authorized entity listed within the top-level ACL or at least one of the one or more nested ACLs, the system further determines if the access rights of the first entity (e.g., as maintained by the ACL or nest ACL(s)) provides the requested level of access rights, and access to the object is only granted where the access rights requested by the first entity are granted to the first entity.

Figure 5:
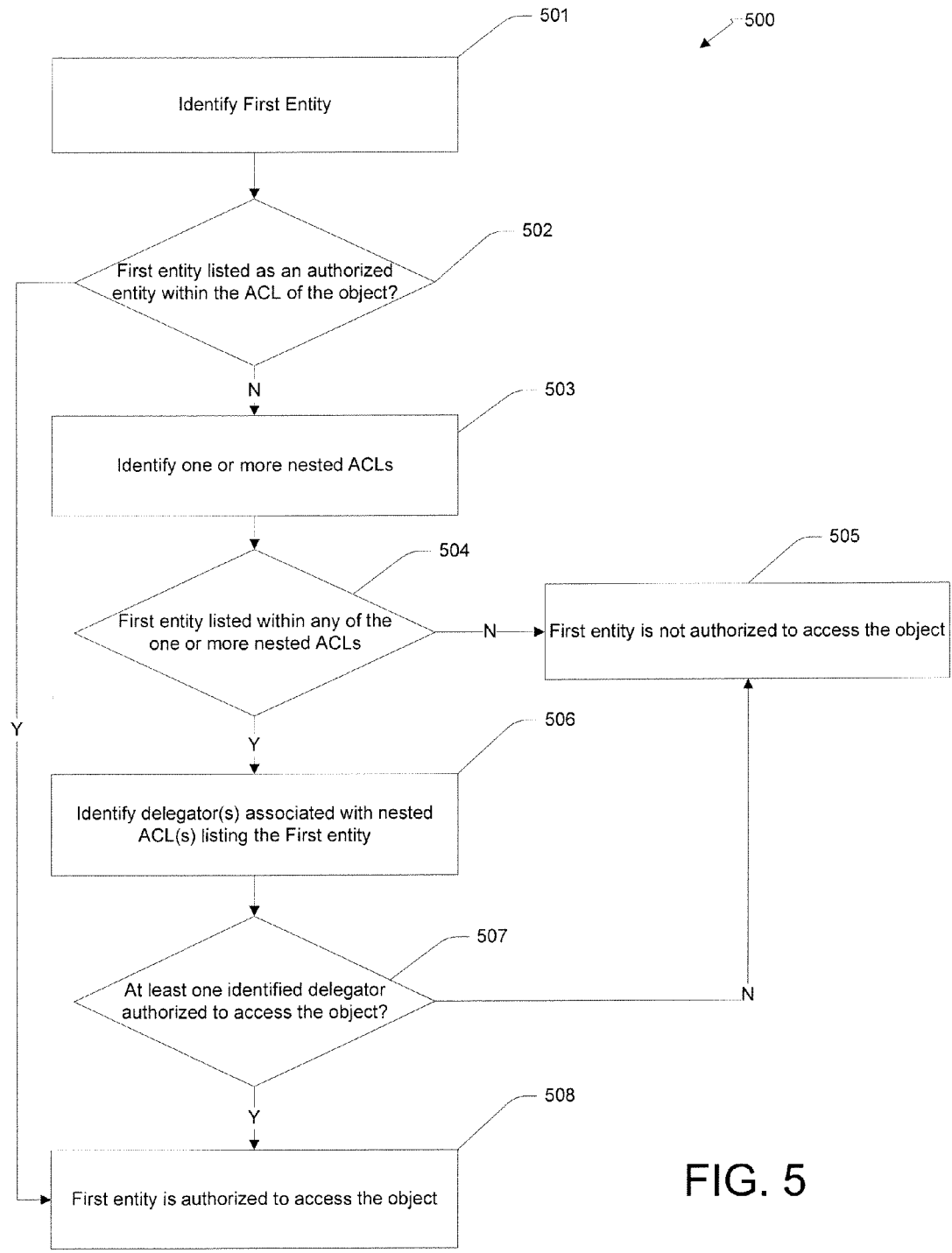
FIG. 5 illustrates a flow diagram of an example process for determining whether an entity is authorized to access an object.

FIG. 5 illustrates a flow diagram of an example process 500 for determining if a first entity is authorized to access the object. In block 501, the system identifies a first entity. The first entity may be an entity requesting access to an object (e.g., another object or user) or a delegator associated with a requesting entity. In block 502, the system determines if the identified first entity is listed within the ACL of the object. In one example, the system retrieves the ACL associated with the object. In another example, the ACL may be maintained by a remote ACL service, and the system may provide an identifier of the entity (e.g., a user identifier, group identifier or object token ID) to the ACL for determining if the first entity is one of the one or more entities listed within the ACL of the object (e.g., listed within the top-level ACL). The ACL includes a list of one or more authorized entities having access rights to the object. If in block 502, the system determines that the first entity is one of the one or more entities listed within the ACL of the object, the process continues to block 508.

In block 508, the system determines that the first entity is authorized to access the object. The determination may be provided as a result of a query to another process or system. If on the other hand, in block 502 the system determines that the first entity is not listed within the top-level ACL, the process continues to block 503. In block 503, the system identifies one or more nested ACLs within the ACL of the object. In one example, where the ACL does not include any nested ACL, the process may continue to block 505. Each nested ACL has a delegator, which is either a user identity (e.g., a user or group ID) or a capability (e.g., a token ID associated with an object). The nested ACL's entries grant access similar to the top-level ACL's entries. However, the access granted by the nested ACL is limited to the access rights of the delegator. In block 504, the system determines if the first entity is listed as an authorized entity within one or more of the determined nested ACLs. If in block 504, the system determines that the first entity is one of the one or more authorized entities listed within of the one or more nested ACL of the object, the process continues to block 506. Otherwise, in block 505, the system determines that the first entity is not authorized to access the object. The determination may be provided as a result of a query to another process or system.

In block 506 the system identifies the delegator associated with each of the one or more nested ACLs listing the first entity. In block 507, for each of the identified delegator(s) the system determines if the identified delegator is authorized to access the object. In one example, the determination of block 507 is performed according to process 500 where the identified delegator(s) is the first entity. If in block 507 the system determines that at least one identified delegator is authorized to access the object, the system continues to block 508 and determines that the first entity is authorized to access the object. The determination may be provided as a result of a query to another process or system.

IV. Example Implementation: Granting Temporary Access to Collaboration Objects

In one example, the above system and processes may be used to facilitate granting temporary access to private objects (e.g., objects with limited access) by participants of a collaboration session (e.g., meeting) while the collaboration session is ongoing. Typically, access to a collaboration object is granted on a user-by-user basis, or may be granted to all users belonging to a specific pre-defined group. The present system and method facilitate granting access to one or more objects being shared and collaborated on during a collaboration session, to the collaboration session. The collaboration session may then grant access to its one or more participants using its access rights.

For example, a first user (e.g., a participant of the collaboration session) having access rights to an object (e.g., a document, video, audio) which includes delegation rights (e.g., write access allowing the user to modify the ACL of the object) uses his/her credentials to modify the ACL for the object to provide access to the collaboration session. A capability token (hereinafter referred to interchangeably as a token) is generated upon receiving a user request to share access to the object with the collaboration session. The token is provided to the collaboration session and a token ID (e.g., a hash of the token) is added to the ACL of the object.

The collaboration session can use the token credentials to grant access to other participants of the collaboration session. As a result, all participants of the collaboration session will be given access to the object. The ACL of the object may record each participant in the top-level ACL, or may generate a nested ACL which includes a listing of all participants of the collaboration session. The ACL of the document may further track of the source of access for each entry (or nested ACL) within the ACL. For example, the ACL of the document, may include a nested ACL with the collaboration session as the delegator. In another example, where the ACL is single level ACL, the ACL may include an entry for the delegator (e.g., the added by field of FIG. 8) which indicates the source of access for those entities (e.g., user or object token) which have been granted access by another entity. The ACL and/or nested ACL may further include a field listing the scope (i.e., an identifier of the entity), and/or a role field indicating the access rights level of the scope (e.g., the type of access given to each listed authorized entity). An example ACL for an object is described in further detail below with respect to FIG. 8.

The access rights of each authorized entity with respect to the object are valid as long as the access of its delegator is valid. Furthermore, the level of access of the authorized entity may not exceed the level of access of the source of its access. Once the collaboration session is completed, the collaboration session revokes its access to the object by requesting to remove its token from the ACL. The ACL removes the token which in turn implicitly removes all participants that were added by the token (i.e., authorized entities with the token listed as their delegator). Accordingly, the subject disclosure provides an efficient method of providing temporary access to collaboration objects to participants of the collaboration session.

Each object may be associated with an. Access Control List (ACL). An access control list (ACL), with respect to a computer file system, is a list of permissions attached to an object.

An ACL specifies which users (individually or as a member of a group) or objects are granted access to objects, as well as what operations are allowed on given objects. Each entry in a typical ACL may specify a subject and an operation. The ACL may include a listing of authorized entities (e.g., users, groups and/or objects) granted access to the object. In one example, the ACL may further include information regarding the source of access for each authorized entity.

In one example, a user at a client device (e.g., electronic devices 102, 104 or 106) participating in a collaboration session (e.g., using a meeting client application) may request to share an object within the collaboration session for the purpose of viewing and collaboration. The user has delegation rights to the object (e.g., the owner of the second object or an editor with rights to add entries to the ACL of the second object) and may request to share his/her access and delegation rights with the collaboration session. The user may further indicate access limitations regarding the level of access (i.e., the access rights) of the collaboration session with respect to the object.

In response to the request, the system (e.g., hosted at server 110) generates a token and provides the token to the collaboration session. The system further generates a token ID (e.g., hash of the token) and requests to add the token ID (e.g., hash of the token) as an entry within the ACL of the object (e.g., by sending a request to a remote ACL service maintaining the ACL of the object). The ACL entry may further indicated the level of access of the token with respect to the object which defines the access rights of the collaboration session (e.g., as indicated by the user and/or not exceeding the level of access of the user). The ACL may be maintained by the server 110 or may be maintained by a remote server 120 communicatively coupled with server 110. For example, a request may be sent to a remote ACL service (e.g., hosted at a remote server 120) to update the ACL of the second object.

The collaboration session may then exercise the token in order to share access with other objects or users. The first object may use its capability as a delegator to grant access to other entities (e.g., users or objects associated with the collaboration session such as participants of the collaboration session). The request by the collaboration session is presented using the token. The system receives the request and accesses the ACL of the object. The system compares the token with the entries of the ACL and determines that the token appears within the ACL as an authorized entity having delegation rights. In another example, where the ACL is maintained remotely, the system may provide the token ID to a remote ACL service for comparison and may receive the result of the comparison and determine whether the first object is an authorized entity. The system then adds the listed of one or more entities to the ACL (e.g., to the top-level ACL or as a nested ACL) in association with the token. For example, the system may request that the ACL service maintaining the ACL, modify the ACL of the object to include the one or more entities.

When a user participating in the collaboration session or another entity (e.g., a second object having the collaboration object embedded therein) requests to access the object, the system looks up the user (or other entity) within the ACL of the object. The ACL lookup may include looking up all authorized entities listed within the nested ACLs of the ACL. The ACL lookup may include sending a request to the remote ACL service maintaining the ACL or looking up the ACL directly (e.g., where the ACL is maintained locally or is directly accessible by the system).

Thus, if a user participating in the collaboration session (or other entity associated with the collaboration session) has been granted access through the token associated with the collaboration session, the system determines that the entity has access to the object and provides access to the object. Since the access rights of each of the one or more entities are directly associated with the token associated with the collaboration session, when the access rights of the collaboration session terminate, the token associated with the collaboration is removed from the ACL. Thus, any access rights associated with the token are no longer valid and will not result in granting access to any entities being added to the ACL through the capabilities of the token.

Figure 6:
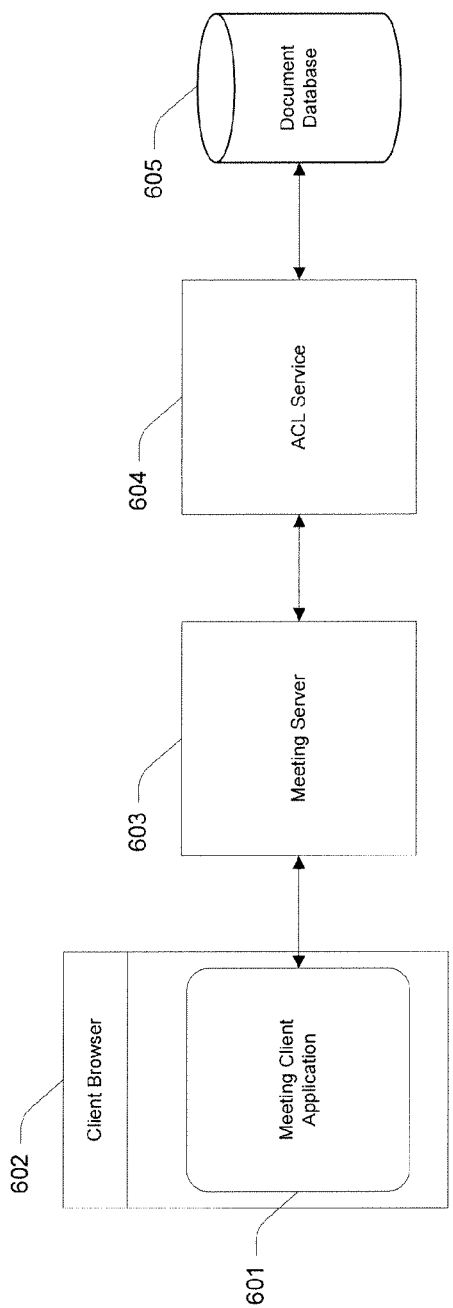
FIG. 6 illustrates a block diagram of an example system for facilitating granting temporary access to collaboration objects within a collaboration session.

III. Example System Diagram for Facilitating Granting Temporary Access to Collaboration Objects FIG. 6 illustrates a block diagram of an example system for facilitating granting temporary access to collaboration objects. The system comprises a meeting client application 601 communicably coupled to a meeting server 603 (e.g., server 110). The meeting client application may be a browser-based or other computer-based application executed at the client device (e.g., electronic device 102, 104 and 106). For example, FIG. 6 illustrates the client application being executed within a client browser 602 (e.g., a browser running at a client device).

The meeting server 603 (e.g., implemented within server 110), may be configured to facilitate one or more collaboration sessions between one or more users interacting with one or more client devices (e.g., electronic devices 102, 104 and 106), for example through the meeting client application 601. The meeting server may further be configured to receive a request from a user (e.g., a participant of a collaboration session) to share access to one or more objects with a collaboration session initiated at the meeting server and being displayed to one or more users at one or more meeting client applications. The meeting server may further facilitate displaying a user interface of the collaboration session and one or more collaboration objects shared during the collaboration session at the meeting client application.

In one example, the meeting server 602 is communicably coupled to an ACL service 604 (e.g., running on server 110 or one or more remote servers 120). The ACL service may contacted by the meeting server (e.g., hosted at server 110), and may be configured to cause modifications to the ACL (to add or remove authorized entities, modify level of access rights granted to each entity, add nested ACLs to the ACL, etc.). In this manner, the system does not need to include any special protocols for communicating with different ACLs belonging to different types of objects. Instead, the ACL service 604 acts as an intermediary and is in communication with a database 605 maintaining one or more ACLs belonging to one or more objects and/or one or more objects.

Figure 7:
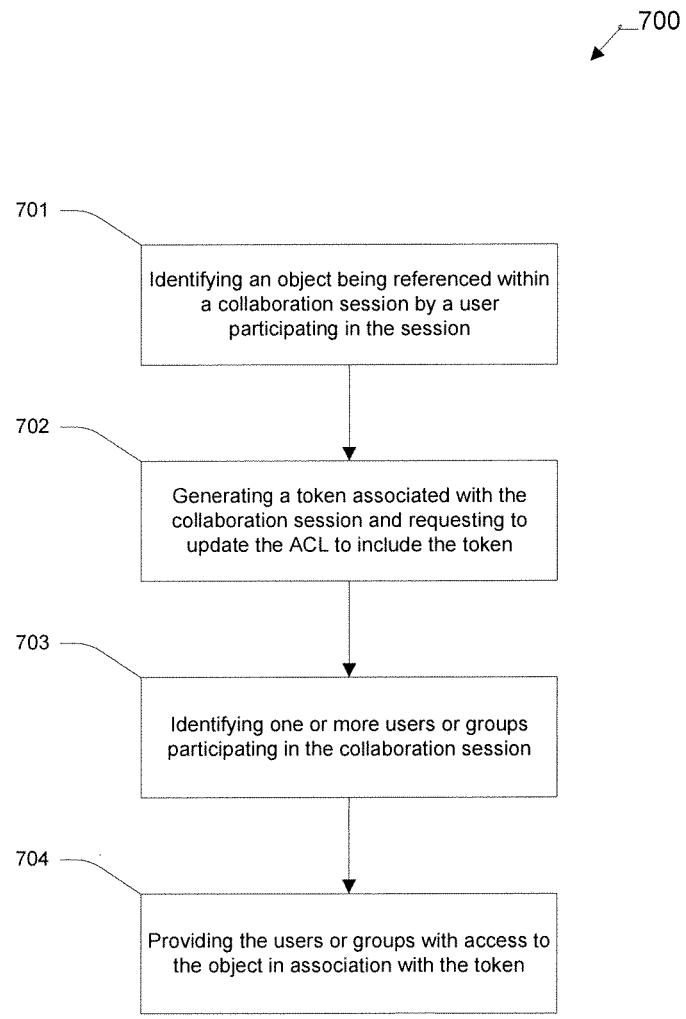
FIG. 7 illustrates a flow diagram of an example process for facilitating granting access to a collaboration object to one or more participants of a collaboration session.

Example Processes for Facilitating Granting Temporary Access to Collaboration Objects FIG. 7 illustrates an example flow diagram of a process 700 for facilitating granting temporary access to a collaboration object to one or more participants of a collaboration session. In step 701, the system identifies an object being referenced within a collaboration session by a first user participating in the session. The first user may have access rights that include rights to delegate access rights to the document (e.g., write access to the object). In step 702, the credentials of the first user (e.g., access rights of the first user with respect to the object) are used to provide the collaboration session (or meeting server hosting the collaboration session) with access rights to the object through a capability token. For example, the credentials of the first user are used to add a token held by the collaboration session to the ACL of the object. The process of granting a first object (e.g., a collaboration session or meeting server hosting the collaboration session) with access to a second object through a capability token may be performed according to process 200 described above with respect to FIG. 2.

Next, in step 703, the system identifies one or more users or groups participating in the collaboration session. In step 704, the system provides the identified users or groups with access to the object using the token associated with the collaboration session. The identification of users may occur for the duration of the collaboration session, such that any users joining the collaboration session at any time during the duration of collaboration session are identified by the system. As the system identifies users or groups associated with the collaboration session, the system provides the identified users and/or groups with access to the object using the token. In one example, the token held by the collaboration session provides the collaboration session with access rights, including delegation rights, with respect to the first object. The collaboration session (e.g., meeting server hosting the collaboration session) is able to exercise the rights granted to it via the token to modify the ACL of the first object (e.g., the change may be propagated through the ACL service 204).

The one or more users or groups participating in the collaboration session are added as authorized entities to the ACL of the first object (e.g., at the top-level or through a nested ACL). An example process for granting access to one or more entities (e.g., collaboration session participants) by a first object (e.g., a collaboration session or meeting server) using a nested ACL may be performed according to process 300 as described above with respect to FIG. 3. Each time a new participant joins the session, the collaboration session (or meeting server hosting the collaboration session) requests to modify the ACL of the first object to add the new participant to the ACL (e.g., as an entry within the top level ACL or a nested ACL), using the token. Alternatively, a participant may be added to the ACL upon the user requesting access to the first object. In such instance, if the user (or group) is not added to the object ACL until just before the user needs access, the embedded content is likely not discoverable by the user with respect to the search until the user's first request to access the object.

When a user views the ACL of the document, the identity of the participants of the collaboration session may not be visible. Instead, the user may only see the identity of the collaboration session within the ACL. Once the participants of the collaboration session join the session, and request to access the first object, the system grants the participant access according to the request. The process for granting a first entity (e.g., a participant of the collaboration session) with access to the first object may be performed according to processes 400 and/or 500 described above with respect to FIGS. 4 and 5.

The access rights of the participants of the collaboration session with respect to the object may be limited by the rights of the delegator (i.e., the collaboration session token). Thus, at the completion of the meeting, the collaboration session (or meeting server hosting the collaboration session) may revoke access to the first object by all participants of the collaboration session. The collaboration session (or the meeting server hosting the collaboration session) may request to update the ACL to remove its token (e.g., the change may be propagated through the ACL service). This will implicitly remove any access rights of entities listed within the ACL or any nested ACLs where the token was listed as a delegator.

Example Access Control List Corresponding to an Object

Figure 8:
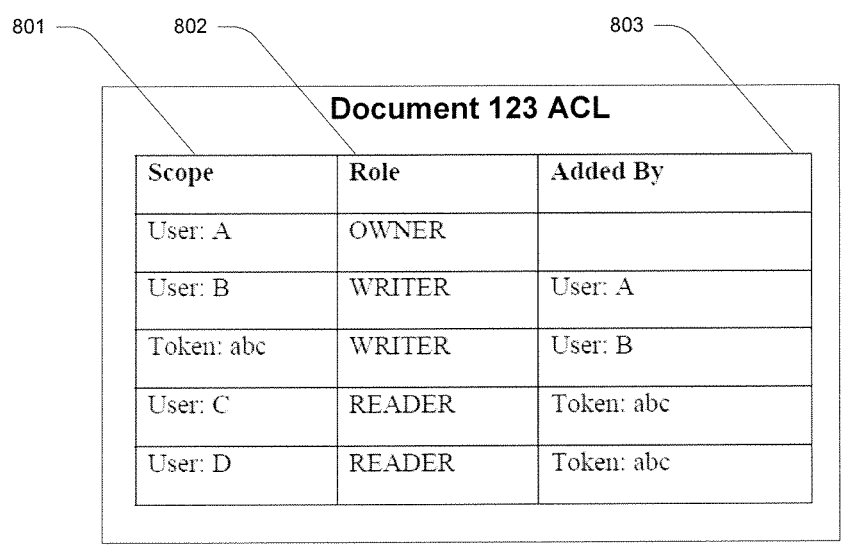
FIG. 8 illustrates an example Access Control List (ACL) corresponding to an object.

FIG. 8 illustrates an example Access Control List (ACL) 700 corresponding to an object. The ACL 800 of the object includes a listing of authorized entities having access rights to the object. The ACL 800 includes a first field listing the scope filed 801 (i.e., an identifier of the entity), a role field 802 indicating the access rights level of each entity (e.g., the type of access given to each listed authorized entity), and an added by field 803 which indicates the delegator or source of access for each authorized entity (e.g., user or object token). The scope filed 801 of the illustrated ACL provides an identifier of each authorized entity. Here, the authorized entities include 4 users A, B, C and D and a token abc (e.g., associated with a collaboration session or other object). The role filed 802 lists the role associated with each authorized entity which defines the access rights level of that entity with respect to the object. For example, a first user A is listed as the OWNER and may have both read/write access to the object, which include delegation rights to share the object with others. User B and token abc are listed as WRITER which gives them read/write access and delegation rights to share the object. Users C and D are listed only as READER which indicates an access right level of reading the object, such that those users cannot edit the object or modify the ACL of the object (e.g., share the object with others). The added by field 803 indicates a delegator for each authorized entity which was granted access rights by another entity. For example, user A does not have a delegator, because his/her rights are granted in accordance with being the owner of the document. However, Users B, C, and D and token abc are each given access rights to the document through another authorized entity (e.g., their rights may be limited by the rights of their delegator).

V. Example Systems for Facilitating Sharing and Access Control

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

FIG. 9 conceptually illustrates an electronic system with which some implementations of the subject technology are implemented. Electronic system 900 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. For example, the various memory units include instructions for facilitating object-oriented sharing and access control according to various embodiments. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that functions as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), or an Intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, executed by one or more computing devices, for providing secure access to an object to a participant of a collaboration session, the method comprising:
receiving, using the one or more computing devices, an indication of a request from a first entity to share access and delegation rights to a second object with a first object, the second object having a corresponding access control list (ACL) including a listing of one or more authorized entities having access to the second object including the first entity;
generating, using the one or more computing devices, a token representing access and delegation rights of the first object with respect to the second object and providing the token to the first object;
adding, using the one or more computing devices, a token identifier (ID) corresponding to the token to the ACL of the second object, using the one or more computing devices, such that the first object is added to the authorized entities having access and delegation rights to the second object; and
receiving, using the one or more computing devices, a request, from the first object, to share access to the second object with one or more entities associated with the first object.

2. The method of claim 1, further comprising:
generating, using the one or more computing devices, a nested access control list (nested ACL) in response to the request from the first object;
adding the nested ACL to the ACL and associating the nested ACL with the token ID within the ACL; and adding, using the one or more computing devices, the one or more entities to the nested ACL, such that the one or more entities are granted access to the second object.

3. The method of claim 1, further comprising:
updating the ACL to remove the token ID from the ACL, wherein removing the token ID revokes the access of the first object and the one or more entities to the second object.

4. The method of claim 1, wherein each of the one or more authorized entities and the one or more entities is associated with a level of access representing the rights of the respective authorized entity with regard to the second object.

5. The method of claim 4, wherein the level of access of the first entity includes delegation rights providing the first entity with authorization to share access to the second object with other entities, and
wherein the level of access of the first object is at most equal to the level of access of the first entity.

6. The method of claim 4, wherein the level of access of each of the one or more entities within the nested ACL is at most equal to the level of access of the first object.

7. The method of claim 4, further comprising:
determining that the level of access of the first object includes delegation rights providing the first object with authorization to share access to the second object with the one or more entities in response to receiving the request from the first object,
wherein the blocks of generating the nested ACL and adding the one or more entities to the nested ACL is performed in response to determining that the level of access of the first object includes delegation rights.

8. The method of claim 1, further comprising:
receiving a request from a second entity to access the second object;
determining if the second entity is listed as an authorized entity within the ACL of the second object in response to receiving the request;
granting the second entity with access to the second object if it is determine that the second entity is listed as an authorized entity within the ACL of the second object;
identifying one or more nested ACLs including the first nested ACL within the ACL of the second object if it is determine that the second entity is not listed as an authorized entity within the ACL of the second object, each of the one or more nested ACLs including a listing of one or more entities; and
determining if the second entity is listed as one of the one or more entities within one of the identified one or more nested ACLs.

9. The method of claim 8, further comprising granting the second entity with access to the second object if it is determined that the second entity is listed as one of the one or more entities within the ACL of the second object.

10. The method of claim 8, wherein each of the one or more nested ACLs is associated with a delegator, the delegator being an entity that shared access with the one or more entities of the nested ACL.

11. The method of claim 10, further comprising:
determining if the delegator associated with the one of the one or more nested ACLs has appropriate access rights for accessing the second object; and
granting the second entity with access to the second object if it is determine that the second entity is listed as one of the one or more entities within the ACL of the second object and the delegator associated with the one of the one or more nested ACLs has appropriate access rights for accessing the second object.

12. The method of claim 1, further comprising:
receiving a request from one of the one or more entities to access the second object, and providing the one of the one or more entities with access to the second object.

13. The method of claim 1, wherein modifying the access rights of the first entity causes a modification of the access rights of the first object.

14. The method of claim 1, wherein modifying the access rights of the first object causes a modification of the access rights of the one or more entities.

15. A system for providing secure access to an object to a participant of a collaboration session, the system comprising:
one or more processors; and
a non-transitory machine-readable medium comprising instructions stored therein, which when executed by the processors, cause the processors to perform operations comprising:
receiving an indication of a request from a first entity to share access and delegation rights to a second object with a first object, the second object having a corresponding access control list (ACL) including a listing of one or more authorized entities having access to the second object including the first entity,
wherein each of the one or more authorized entities is associated with a level of access representing the rights of the respective authorized entity with regard to the second object and wherein the level of access of the first entity includes delegation rights providing the first entity with authorization to share access to the second object with the first object;
generating a token representing access and delegation rights of the first object with respect to the second object and providing the token to the first object; and
adding a token ID corresponding to the token to the ACL of the second object, using the one or more computing devices, such that the first object is added to the authorized entities having access and delegation rights to the second object.

16. The system of claim 15, the operations further comprising:
receiving a request, from the first object, to share access to the second object with one or more entities associated with the first object;
determining the access right level associated with the first object;
adding the one or more entities to the listing of users having access to the second object in response to determining that the access right level associated with the first object includes delegation rights providing the first entity with authorization to share access to the second object with the first object.

17. The system of claim 16, wherein the block of adding the one or more entities comprises:
generating a nested access control list including the one or more entities; and
adding the nested ACL to the ACL and associating the nested ACL with the token ID within the ACL, such that the one or more entities are granted access to the second object.

18. The system of claim 16, wherein determining the access rights of the first object comprises:
identifying the token ID associated with the first object within the ACL of the second object; and
determining the access right level associated with the token ID.

19. The system of claim 15, wherein the level of access of the first object is at most equal to the level of access of the first entity.

20. A non-transitory machine-readable medium comprising instructions stored therein, which when executed by a machine, cause the machine to perform operations comprising:
- receiving a request, from the first object, to share access to the second object with one or more entities associated with the first object, the request including a token having a token ID and being associated with the first object, the second object having a corresponding access control list (ACL) including a listing of one or more authorized entities having access to the second object including the first entity wherein each of the one or more authorized entities is associated with a level of access representing the rights of the respective authorized entity with regard to the second object;
- determining the level of access of the first object, the determining including looking up the token ID within the ACL, wherein the token ID is listed as one of the one or more authorized entities and determining the access right level associated with the token ID;
- generating a nested access control list including the one or more entities in response to determining that the access right level associated with the first object includes delegation rights providing the first object with authorization to share access to the second object with other entities; and
- adding the nested ACL within the ACL and associating the nested ACL with the token ID within the ACL, such that the one or more entities are granted access to the second object.

21. The machine-readable medium of claim 20, the operations further comprising:
- receiving an indication of a request from a first entity to share access and delegation rights to the second object with the first object, wherein the level of access of the first entity includes delegation rights providing the first entity with authorization to share access to the second object with the first object;
- generating a token representing access and delegation rights of the first object with respect to the second object and providing the token to the first object; and
- adding the token ID corresponding to the token to the ACL of the second object such that the first object is added to the authorized entities having access and delegation rights to the second object.

22. The machine-readable medium of claim 20, the operations further comprising:
- receiving a request from one of the one or more entities to access the second object, and providing the one of the one or more entities with access to the second object in response to determining that the one of the one or more entities is listed within a nested ACL within the ACL of the first object.

* * * * *